Figure 1:
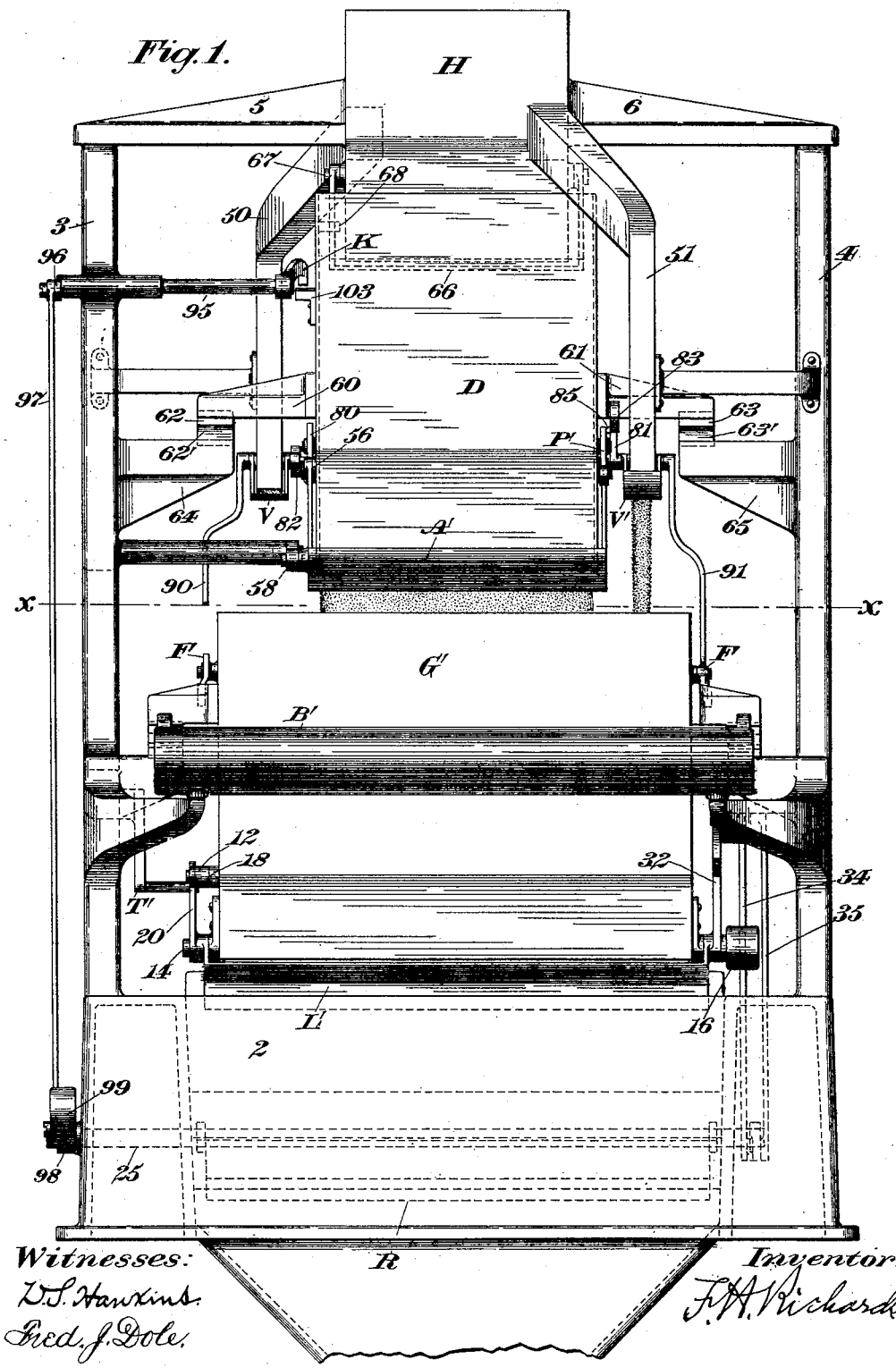

No. 615,195. Patented Nov. 29, 1898.
F. H. RICHARDS.
WEIGHING MACHINE.
(Application filed Nov. 17, 1897.)
(No Model.) 6 Sheets—Sheet 1.

Witnesses:
D. S. Hawkins.
Fred. J. Dole.

Inventor:
F. H. Richards.

No. 615,195. Patented Nov. 29, 1898.
F. H. RICHARDS.
WEIGHING MACHINE.
(Application filed Nov. 17, 1897.)
(No Model.) 6 Sheets—Sheet 2.

Witnesses:
D. S. Hawkins
Fred. J. Dole.

Inventor:
F. H. Richards.

No. 615,195.  
F. H. RICHARDS.  
WEIGHING MACHINE.  
(Application filed Nov. 17, 1897.)  
Patented Nov. 29, 1898.

(No Model.)

6 Sheets—Sheet 3.

Witnesses:  
D. S. Hawkins  
Fred. J. Dole.

Inventor:  
F. H. Richards

No. 615,195. Patented Nov. 29, 1898.
F. H. RICHARDS.
WEIGHING MACHINE.
(Application filed Nov. 17, 1897.)
(No Model.) 6 Sheets—Sheet 4.

Witnesses: Inventor:
W. S. Hawkins. F. H. Richards.
Fred. J. Dole.

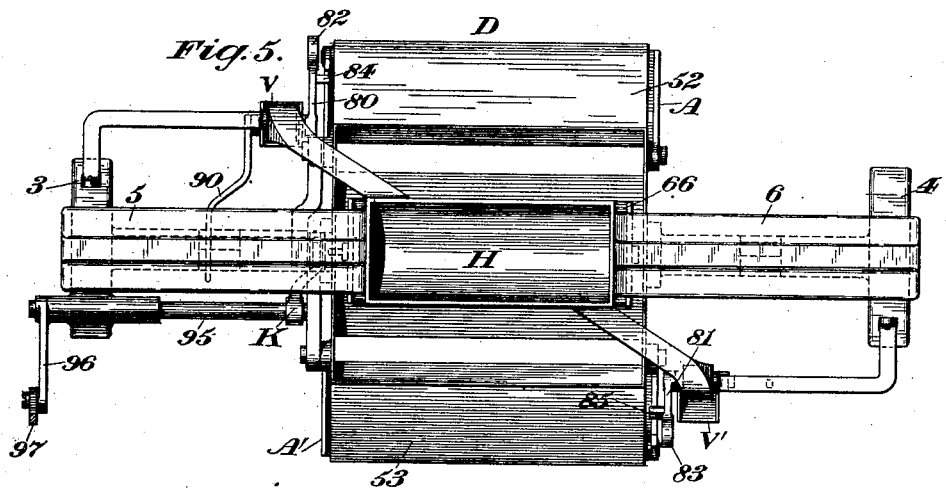

No. 615,195.  
F. H. RICHARDS.  
WEIGHING MACHINE.  
(Application filed Nov. 17, 1897.)  
(No Model.)  
Patented Nov. 29, 1898.  
6 Sheets—Sheet 6.
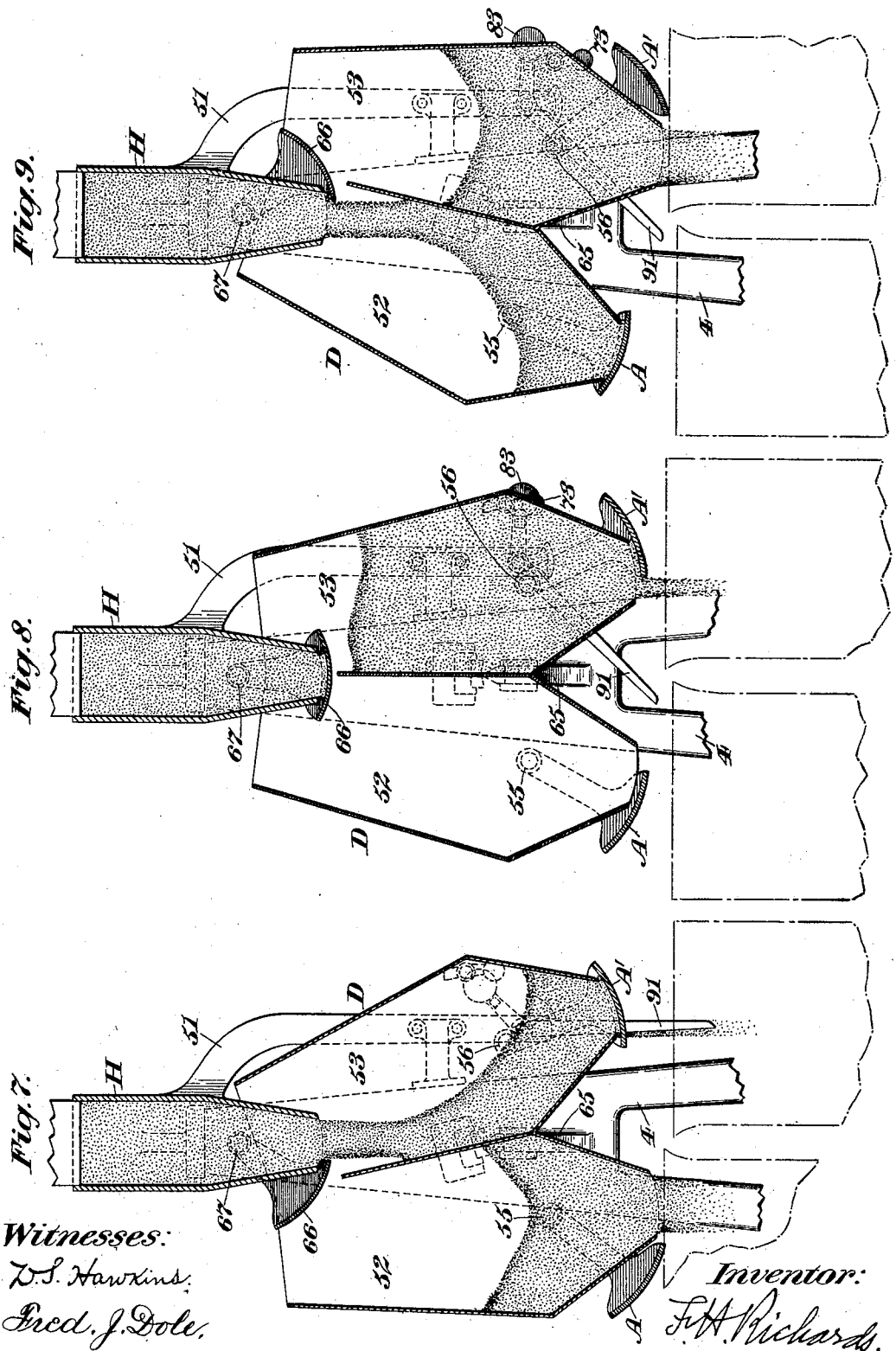
Witnesses:  
W. S. Hawkins.  
Fred. J. Dole.
Inventor:  
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 615,195, dated November 29, 1898.

Application filed November 17, 1897. Serial No. 658,849. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of material in large lots with rapidity and precision.

The invention includes as to one of its features, in combination with weighing apparatus involving one or more load-dischargers, a regulator in position to be shifted successively by the loads discharged and stop or locking mechanism operative with the regulator and movable into position to block the discharge movement of one of the dischargers and the return movement of the other discharger, by reason of which the simultaneous discharge of two loads is prevented. The load-dischargers may consist of closers, and in such construction one of them is prevented from opening to discharge a load, while the other is held against shutting until the entire load is discharged.

Another object of the invention is to combine with weighing apparatus including one or more load-receivers a supply device constructed and shiftable to deliver a part of a load or loads to the receiver or receivers, a regulator in position to be shifted successively by the loads discharged from the receivers, and means operative with the regulator for locking the supply device in a shifted position, whereby said supply device cannot tilt to deliver any part of its contents to a discharging load-receiver or until the latter has resumed its primary position.

Another feature of the invention resides, in connection with the weighing and supply apparatus, the latter involving a shiftably-mounted device, independent drip-supply means, which is started in operation by power derived from the supply device on its working movement. The drip-supply means may consist of a conduit or pipe provided with a valve, in which case the valve is opened by the shifting of the supply device as it moves from one position to another.

Figure 2:
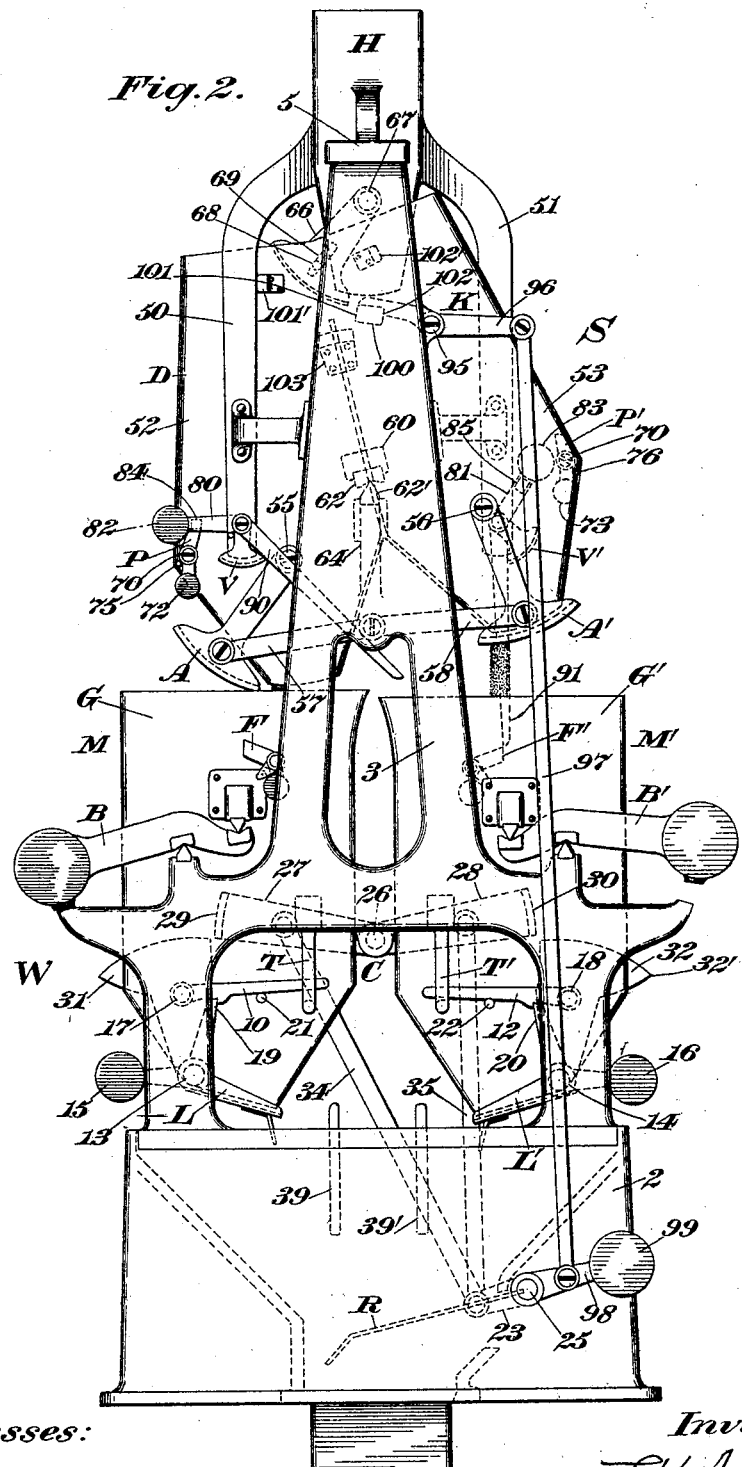
Figure 3:
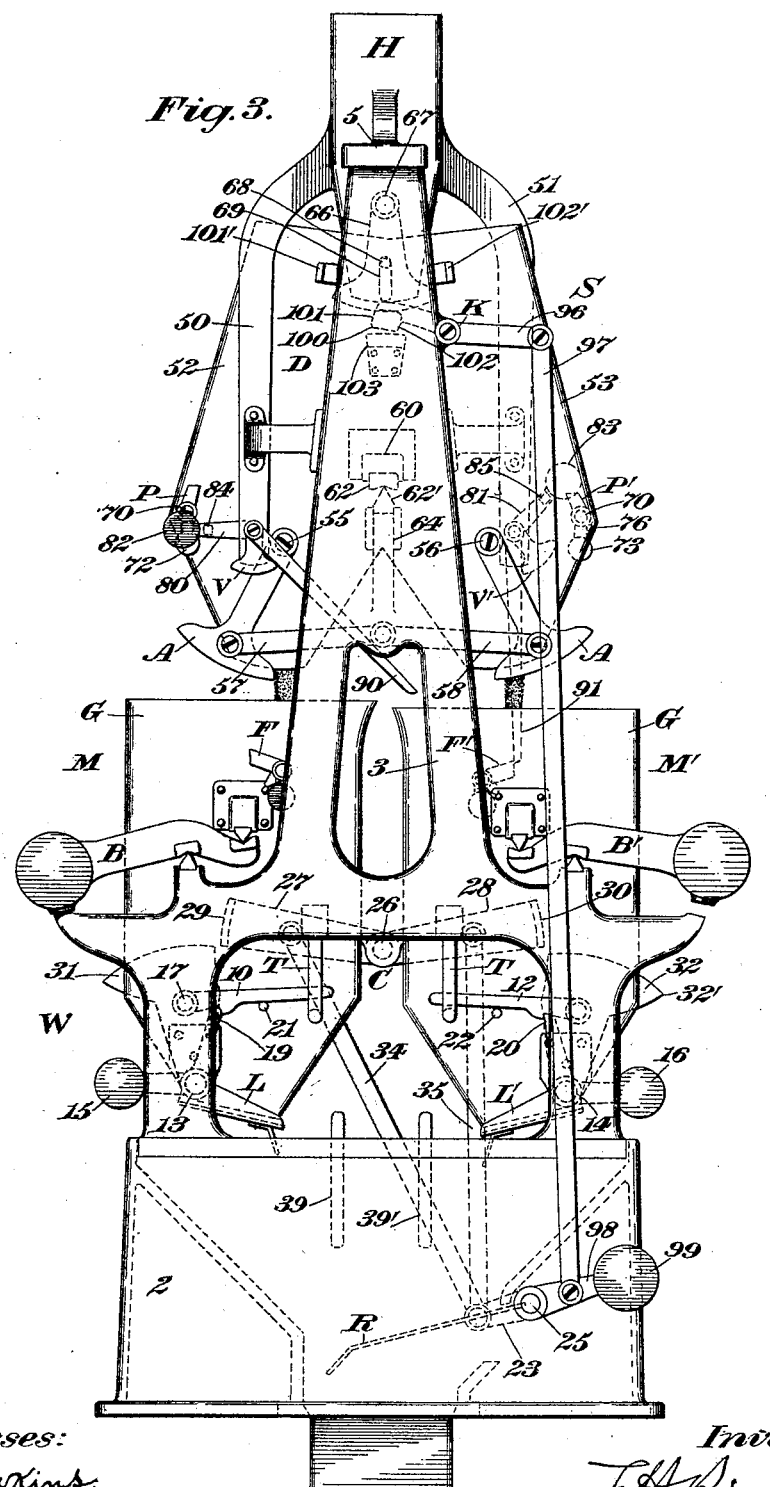
Figure 4:
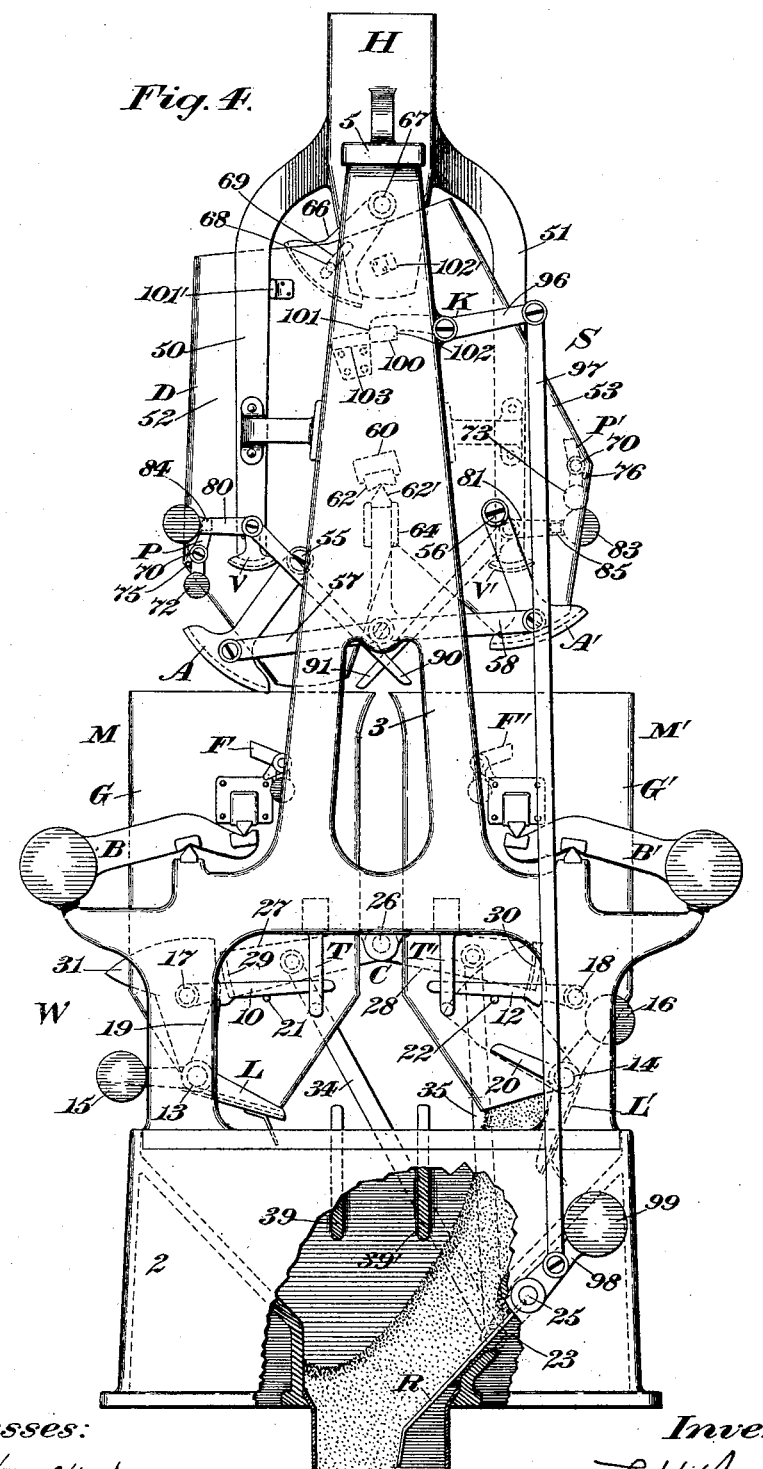

In the drawings accompanying and forming part of this specification, Figure 1 is a front elevation of my improved weighing-machine. Figs. 2, 3, and 4 are side elevations of the same as seen from the left in Fig. 1 and show the positions occupied by the different parts during the operation of the machine. Figs. 5 and 6 are plan and sectional plan views taken above and below, respectively, the line X X, Fig. 1; and Figs. 7, 8, and 9 are longitudinal central sections of part of the supply mechanisms.

Similar characters designate like parts in all the figures of the drawings.

My present invention includes in its organization weighing apparatus and supply mechanism therefor, which may be of any preferred construction, and those represented for carrying out the invention will be hereinafter described.

The weighing apparatus is designated in a general way by W and the supply apparatus by S, and said weighing apparatus includes one or more weighing mechanisms, as M and M'.

The framework for supporting the different parts of the machine consists of a base or bed 2, the side frames 3 and 4, and the brackets 5 and 6, extending oppositely from the supply-hopper H and resting upon and secured to the two side frames.

Each of the weighing mechanisms comprises a load-receiver and a supporting-beam therefor, the load-receivers being designated, respectively, by G and G' and their beams by B and B', said beams being mounted upon the side frames 3 and 4 and the load-receivers being carried by the poising ends of the two beams in a manner familiar in this art—as shown, for example, in Letters Patent No. 548,840, granted to me October 29, 1895.

The load-discharging means for the respective load-receivers include in the present case a closer and a latch coöperative with each load-receiver, and the closers are designated, respectively, by L and L' and the holding-latches by 10 and 12, the closer L being pivoted to the load-receiver G, as at 13, and the closer L' being similarly connected to the load-receiver G', as at 14, and said closers have the counterweights 15 and 16, respectively, for shutting the same on the discharge of a load.

The latches 10 and 12 are pivoted, as at 17 and 18, to the receivers G and G' and are adapted to engage the crank-arms 19 and 20, respectively connected with the closers L and L', said latches resting upon the stops or pins 21 and 22, respectively, on the two load-receivers.

It will be evident from the preceding description that my present invention includes a plurality of weighing mechanisms each of which involves a load-discharger, the load-dischargers consisting of the closers L and L', although other types of load-dischargers might be employed without departing from the scope of the invention.

To prevent the simultaneous discharge of the two loads, I provide stop or locking mechanism operative on the discharge of a load to prevent the discharging movement of one of the load-dischargers and the return movement of the other discharger, and, as stated, as these dischargers consist of closers it will be evident that one of said closers is prevented from opening while the other is open, and the open closer will be held against shutting until the discharging load has entirely passed from the proper weighing mechanism. The stop mechanism for securing this function is operable, preferably, by a regulator successively shiftable by loads intermittingly discharged from the respective weighing mechanisms.

The regulator may consist of a plate R of relatively large area, secured to the rock-shaft 25, journaled in bearings in the base and extending beyond the latter, as represented in Fig. 1, and the several side elevations for a purpose that will hereinafter appear.

The closer-blocking stop is designated by C, is pivoted, as at 26, upon the side frame 4, and consists of the oppositely-disposed segments 27 and 28, provided with stop-flanges 29 and 30, the purpose of which will hereinafter appear. The stops 27 and 28 coöperate with substantially similarly-shaped stops 31 and 32, secured to the closers L and L', respectively. The stops 27 and 28 are connected with the regulator R for operation.

The rock-shaft 25 is provided with a crank-arm 23, to the opposite sides of which the links 34 and 35 are pivoted, said links being likewise joined at their upper ends to the stops 27 and 28, respectively, between their fulcrums and working portions.

It will be assumed that the weighing mechanism M' has completed and has discharged a load, as shown in Fig. 4, at which time the weighing mechanism M is in its primary position with its closer L held shut. On the opening of the closer L' the load is discharged against the regulator-plate R, and the force of impact will lower said regulator-plate, and the crank-arm 23, links 34 and 35, and stops 27 and 28 will be drawn downward, so that the outer face of the flange 29 is carried in front of and across the forward path of the closer-stop 31, while the flange 30 is carried behind and into contact with the point 32' of the stop 32, as indicated in Fig. 4, and said flanges positively prevent opening of the closer L and the retraction or shutting of the closer L', so long as they are in contact with the two closer-stops, and this relation will continue while the regulator is shifted. When the regulator resumes its initial or uppermost position, the two flanges will have been carried above the coöperating closer-stop, so that the closer L is released and can be opened on the tripping of the latch 10 and so that the closer L' can shut. On the discharge of the load from the weighing mechanism M the operation just set forth is reversed.

The loads from two weighing mechanisms are discharged against the guide-plates 39 and 39', extending across the base of the machine, which direct the material toward the regulator to lower the latter.

The supply apparatus includes in its organization a shiftably-mounted supply device or meter, as D, operable, preferably, by gravity and held in its respective shifted positions by means governed by the regulator and independent drip-supplying means, which may consist of the conduits 50 and 51, communicating with the supply-hopper H and adapted to deliver streams of comparatively small size to the receivers G and G', respectively.

The delivery of material by the drip-conduits 50 and 51 to the receivers G and G' is controlled by valves, as V and V', actuated by means on the supply device or meter D as the latter shifts.

The supply device D is oscillatory and has a plurality of compartments or chambers, as 52 and 53, dischargeable, respectively, into the receivers G and G', the contents of each of the chambers or compartments forming the major part of a load in each receiver, said loads being completed by the drip-streams flowing from the conduits 50 and 51.

The discharge of each chamber or compartment 52 and 53 is controlled by valves, such as A and A', pivoted to the supply device, as at 55 and 56, respectively, and connected with a suitable resistance member, such as the framework.

The means for connecting the valves A and A' to the side frame 3 consist of the links 57 and 58, pivoted to the respective parts. The supply device or meter D is mounted for shifting movement upon the framework, and its respective compartments or chambers are supplied with material from the hopper H, and it is provided at opposite sides with the projecting brackets 60 and 61, having the V-shaped bearings 62 and 63, resting on the knife-edges 62' and 63' on the brackets 64 and 65 on the side frames 3 and 4, respectively, the center of gravity of the supply device or meter being located above its true center, whereby said device can be shifted by gravity when released at the proper time in the operation of the machine.

The discharge of material from the hopper H into the chambers of the meter or supply device D is controlled by a valve, such as 66, pivoted at 67 to the hopper and preferably operated by the supply device D as the latter tilts, by reason of which the valve is shut when said supply device is between its two extreme positions, (see Fig. 8,) so as to prevent the entrance of material into either one of the chambers 52 or 53 when said supply device is in its said intermediate position.

The inner wall of the tilting meter D is equipped with the actuator 68 in line with its center of oscillation, passing through the elongated slot 69 in one wall of the valve, by reason of which the valve will be shut to close the orifice of the hopper H when the supply device is in its middle position, as shown in Fig. 3, the compartment 52 at this time discharging its contents into the receiver G.

The oscillating meter or supply device D is shiftable relatively to its valves A and A', the latter being shown in their cut-off positions respectively in Figs. 7 and 9.

In Fig. 2 the compartment 52 is represented as discharging its contents into the receiver G, the compartment 53 having previously discharged its contents into the receiver G' and the valve A' being shut. When the compartment 53 is filled and a stop controlling the operation of the meter is operated, the meter can shift from the position shown in Fig. 2 to that represented in Fig. 9 to uncover the outlet of the compartment or chamber 53 to permit the contents of said chamber 53 to enter the receiver G'.

The actuators for the drip-valves V and V' are operative with the meter D, and they consist, preferably, of by-passes P and P', pivoted, as at 70, near opposite sides of the meter, the lower weighted arms 72 and 73 of said by-pass devices resting normally against the stops 75 and 76, fixed to said meter.

The valves V and V' are equipped with the weighted arms 80 and 81, the weights 82 and 83 of which serve to close the two valves on the completion of a load in the receivers G or G'. The arms 80 and 81 are provided with the projections 84 and 85, adapted to be engaged by the actuators P and P' to open the valves, the latter being held open by suitable means to insure the complete loading of the two receivers.

Means are provided for holding the drip-valves V and V' against immediate closing when they are operated by the meter, and the means illustrated consist of a series of stops of suitable construction adapted to engage devices, as rods, operative, respectively, with the drip-valves.

The devices for engaging and holding the drip-valves open are designated by F and F', and they are in the form of by-pass stops of ordinary construction pivoted upon the load-receivers G and G', respectively, and adapted to coöperate with the rods or bars 90 and 91, secured to the drip-valves V and V'.

When the compartment 52 has discharged its contents into the load-receiver G to form the main part of the load therein, the meter, having been previously released, will tilt, and as it does so the actuator P is moved therewith and swings the valve V open to permit the drip-stream from the conduit or pipe 50 to enter the load-receiver G to complete or top off the load. As the valve V is swung open the rod or bar 90 will be carried in a corresponding direction and into contact with and beyond the by-pass stop F. When the valve reaches its wide-open position, the by-pass stop prevents its immediate closure and until said by-pass releases the rod 90, at which time the weight 82 can drop to shut instantly said valve, and this action will be reversed on the opposite oscillation of the meter.

In Fig. 2 the by-pass actuator P is shown below and in contact with the projection 84 on the valve-closing arm 80, while the by-pass F is illustrated in engagement with the rod 91 of the valve V', the contents of the chamber 52 having been just discharged into the load-receiver G and the load in the receiver G' being substantially completed. When the by-pass stop F' slips off the rod 91, said rod and consequently the valve V' are released, permitting the weight 83 to fall instantly to swing the valve V' under the conduit or pipe 51 to cut off the drip, and following this action the load from the load-receiver G' will be discharged against the regulator R', so as to start the meter-locking means in operation to prevent the movement of the meter. When the regulator returns to its primary position, the meter will be released and can swing from the position shown in Fig. 2 to that shown in Fig. 9, and as the meter moves, the by-pass actuator P being in contact with the projection 84, the valve V will be swung open, as hereinbefore set forth, to allow the drip-stream from the pipe or conduit 50 to complete the load in the load-receiver G.

In connection with the meter or supply device D, I provide a stop or locker, such as K, coöperative with the regulator and adapted when the regulator is shifted by a load to lock the meter in a position to prevent the passage of material from that chamber of the meter which has supplied the emptying load-receiver with material. The locker K consists of an arm secured to the rock-shaft 95, provided at its outer end with the rearwardly-extending crank-arm 96, to which the rod 97 is pivoted, said rod being pivoted at its lower end to the arm 98 on the regulator-shaft 25. The arm 98 is provided with the weight 99 for returning the regulator to its uppermost position when a load has passed from the same. The locker K carries at its free end the detent 100, whose opposite faces 101 and 102 are adapted to engage the opposite catch-faces of the catch or offset 103 on the meter to hold said meter in a shifted position during the discharge of a load.

In Fig. 2 the load in the load-receiver G' is represented as nearly completed, and said load will be completed when the by-pass stop F' slips off the rod 91, at which time the valve V' is shut by the weight 83. The supply-stream from the hopper H during this operation is flowing into the chamber 53, although the material within said chamber 53 is not sufficient to overbalance that in the chamber 52. On the discharge of the load from the receiver G' the mass will fall against the regulator R and lower the same, so that the rod 97 is thrust upward and the detent 100 is forced downward, with the stop-face 101 contiguous to the right-hand catch-face of the projection 103, as shown in Fig. 4, so that the meter D cannot tilt until the regulator R has reached its primary position, at which time the closer L' will be shut and latched. This operation will be repeated on the discharge of the receiver G.

On the completion of loads alternately in the receivers the latches 10 and 12 are carried against the fixed trippers T and T' upon the side frames 3, which raise the latches and permit the respective closers to open. The abutments 101' and 102' on the meter D are adapted to engage the conduits 50 and 51 to limit the oscillatory movement of said meter.

The operation of the hereinbefore-described machine, briefly stated, is as follows: In Fig. 2 the closers L and L' are represented shut and held in such position by the latches 10 and 12, which are in engagement with the arms 19 and 20, connected, respectively, with the closers L and L', and the chamber 53 of the meter has just discharged its contents into the load-receiver G', while the chamber 52 of said meter is delivering its supply into the empty load-receiver G. The drip-valve V' is represented open and held by the by-pass F', engaging the rod or bar 91, the load in the receiver G' being nearly completed. On the completion of the load in the receiver G' the by-pass stop will pass off the rod 91, thereby releasing the valve V' and permitting the same to be shut by the falling weight 83 to cut off the drip-supply. The latch 12 also abuts against the tripper T' to effect the release of the closer L', the load in the load-receiver G then forcing the closer open to discharge the mass against the regulator R, which lowers said regulator and through the hereinbefore-described connections forces the detent 100 of the locker substantially into contact with the catch 103 to prevent the tilting of the meter D. When the closer L opens, it is locked in such position by the regulator stop mechanism, as hereinbefore described, until the entire load is charged. When the regulator R is released by the discharging material, it is returned to its normal position by the weight 99 to cause the release of the closer L', which can shut to repeat the operation of the mechanism M'. When the meter D is released, it can tilt, and as it tilts the actuator P, by engaging the projection 84 on the actuator-arm 80, will swing the valve V' open until the rod 90 is engaged by the by-pass F, it being understood that the load in the load-receiver G has been nearly supplied by the meter-chamber 52. On the discharge of the load from the receiver G the operation described with respect to the receiver G' will be repeated, and these actions will alternate so long as the machine is running.

Having described my invention, I claim—

1. The combination, with a plurality of weighing mechanisms each including a load-discharger, of a regulator in position to be shifted successively by the loads discharged, and stop mechanism shiftable by said regulator, on the working stroke thereof, into position to lock one of said load-dischargers against discharge movement, and simultaneously to lock the return movement of the other load-discharger.

2. The combination, with a plurality of weighing mechanisms each involving a load-discharger, of a regulator in position to be shifted successively by the loads discharged, and two simultaneously-operative stops connected with and operated by the regulator and shiftable into position by said regulator, one of them to lock one of the load-dischargers against discharge movement, and the other stop to lock the other load-discharger against return movement.

3. The combination, with a plurality of weighing mechanisms each involving a pivoted load-discharger, of a supply apparatus; a regulator in position to be shifted successively by the loads discharged; stop mechanism operative with the regulator and shiftable by said regulator on the working stroke thereof into position to lock the respective load-dischargers against movement simultaneously; and means operative with the regulator for also governing the operation of the supply apparatus.

4. The combination, with weighing apparatus involving a plurality of load-dischargers, of a supply apparatus including a tilting meter; a regulator shiftable intermittingly by the loads discharged; stop mechanism shiftable by said regulator to lock the respective load-dischargers against movement; and means operative with the regulator for locking said tilting meter in its two positions.

5. The combination, with a plurality of load-receivers each provided with a pivoted closer, of a regulator in position to be shifted intermittingly by the loads discharged from said load-receivers, and a double stop shiftable by the regulator into position to positively lock one closer against opening movement and the other closer against shutting or return movement and the two parts of said stop being segmental.

6. The combination, with weighing apparatus including a plurality of load-dischargers, of a regulator in position to be shifted intermittingly by the loads discharged, and a double stop supported on the framework between the two load-dischargers and shiftable by the regulator, on the working stroke thereof, into position to positively lock one of the load-dischargers against discharge movement and to lock the other load-discharger against return movement.

7. The combination, with weighing apparatus involving a plurality of load-dischargers, of a regulator shiftable successively by the loads discharged; stops connected with the load-dischargers; and coöperative stops connected with the regulator for operation and having flanges, one of the flanges being adapted to pass in front of one of the load-discharger stops and behind the other load-discharger stops on the shifting of the regulator, thereby to block the operation of said load-dischargers.

8. The combination, with weighing apparatus including a plurality of load-dischargers, of a supply apparatus including a tilting meter supported above the weighing apparatus; a regulator shiftable successively by the loads discharged; a shaft for carrying the regulator; a double stop supported between the load-dischargers; links connecting the two sections of the stop with said shaft; a locking device in position to hold the tilting meter in its two positions; and a rod connecting said locking device and shaft.

9. The combination, with weighing apparatus involving a plurality of load-dischargers, of a regulator shiftable successively by the loads discharged; a shaft for the regulator having an arm; stop mechanism shiftable into position to block the discharging movement of one of the load-dischargers and the return movement of the other load-discharger; and links connected with the respective stops and also with said shaft.

10. The combination, with weighing apparatus involving a plurality of load-receivers, of a reciprocatory meter having a plurality of compartments dischargeable, respectively, into said load-receivers; a regulator shiftable by the loads intermittingly discharged by said receivers; and means operative with the regulator for holding the meter in a shifted position.

11. The combination, with weighing apparatus involving a series of load-receivers, of a gravitative meter shiftable to discharge its contents into said receivers; a regulator operable by the loads successively discharged by said load-receivers; and means governed by the regulator for holding the meter in a shifted position.

12. The combination, with weighing apparatus, of a meter shiftable to discharge its contents into the weighing apparatus; a regulator operable by the loads successively discharged by the weighing apparatus; means operative with the regulator for holding the meter in a shifted position; a supply-hopper located to deliver a stream of material to the meter; and a valve for said hopper actuated by the meter.

13. The combination, with weighing mechanism involving a plurality of separately-operative load-dischargers, of a meter shiftable to discharge its contents into the weighing apparatus and having a projection; a hopper for delivering material into the meter; a valve for said hopper, having a slot located to receive said projection; a regulator operable by the loads successively discharged; and means operative with the regulator for governing the action of the meter and for blocking alternately the operation of said load-dischargers.

14. The combination, with weighing apparatus involving a plurality of load-receivers, of a shiftable meter dischargeable into said receivers and having a catch; a regulator operable successively by the loads discharged; and a detent connected with the regulator and operable thereby to engage the catch.

15. The combination, with weighing apparatus involving a plurality of load-receivers, of a meter having a plurality of compartments dischargeable into the respective load-receivers; a regulator shiftable successively by the loads discharged by said load-receivers; a locker upon the framework for holding the meter in its different positions; and connections between said locker and the regulator.

16. The combination, with weighing apparatus involving a plurality of load-receivers, of a meter supported for oscillation below its center and having a plurality of compartments dischargeable into the respective load-receivers; a supply-hopper for delivering material into the meter and provided with conduits constructed to supply drip-streams to the load-receivers; means for controlling the drip-streams; a regulator shiftable successively by the loads discharged from the load-receiver; and a locker for the meter, operated by the regulator.

17. The combination, with weighing apparatus involving a plurality of load-receivers, of a movably-mounted meter having compartments dischargeable into the respective load-receivers, each of said compartments being valved, and having a valve being carried by the meter and connected with the framework; a regulator shiftable successively by the loads discharged; and a locker for the meter operated by the regulator.

18. The combination, with weighing apparatus involving a plurality of load-receivers, of a gravitative oscillatory meter having compartments dischargeable into the respective receivers and having its center of gravity located above the center of oscillation; valves controlling the delivery of material from the compartments and pivoted to the meter; links connecting the valves with the framework; a regulator shiftable successively by the loads discharged; a link for the meter operated by the regulator; and drip-supplying means for the respective load-receivers.

19. The combination, with weighing apparatus, of a meter shiftably mounted and dischargeable into the weighing apparatus; drip-supplying means; and means operative with the meter for starting the drip-supplying means in operation.

20. The combination, with weighing apparatus, of a meter shiftably mounted and dischargeable into the weighing apparatus; independent drip-supplying means; means operative with the meter for starting the drip-supplying means in operation; a regulator shiftable successively by the loads discharged; and a locker for the meter governed by the regulator.

21. The combination, with weighing apparatus, of a shiftably-mounted meter; drip-supplying means; a valve for controlling the drip; and means operative with the meter as it shifts for actuating the drip-valve for opening the same.

22. The combination, with weighing apparatus, of a shiftably-mounted meter; drip-supplying means; a valve for controlling the drip; and an actuator mounted on the meter, for actuating the valve to open the same as said meter shifts.

23. The combination, with weighing apparatus, of a shiftably-mounted meter; drip-supplying means; a valve for controlling the drip; and a by-pass actuator carried by the meter and operable as the load shifts for actuating the drip-valve to open the same.

24. The combination, with weighing apparatus, of a shiftably-mounted meter; drip-supplying means; a valve controlling the drip; means operative with the meter as it shifts for actuating the drip-valve for opening the same; and means governed by the weighing apparatus for holding the drip-valve open for a predetermined length of time.

25. The combination, with weighing apparatus, of a shiftably-mounted meter; drip-supplying means; a valve for controlling the drip, having an arm provided with a valve-closing weight and furnished with a projection; and an actuator on the meter for engaging said projection to open the valve when the meter shifts.

26. The combination, with weighing apparatus, of a shiftably-mounted meter dischargeable into the weighing apparatus; drip-supply means; a valve for controlling the drip and having a counterweighted arm and a bar; means operative with the meter for engaging said counterweighted arm to open the valve; and a device controlled by the weighing apparatus for engaging said bar on the opening of the valve to prevent the immediate closure of said valve.

27. The combination, with weighing mechanism including a load-receiver, of a supporting-beam; a shiftably-mounted meter for supplying the main part of the load to the load-receiver; independent drip-supplying means for furnishing the remainder of the load; a valve for controlling the drip; a device on the meter for opening said drip-valve; and a by-pass stop carried by one of the members of the weighing mechanism for holding the drip-valve open for a predetermined length of time.

FRANCIS H. RICHARDS.

Witnesses:
F. N. CHASE,
JOHN O. SEIFERT.